United States Patent [19]

Zahradnik et al.

[11] Patent Number: 4,837,264

[45] Date of Patent: Jun. 6, 1989

[54] POLYAMIDE COMPOSITIONS CONTAINING ALKYL ORTHOTITANATE OR DIALKYLTIN DILAURATE

[75] Inventors: Franz Zahradnik, Ludwigshafen; Karlheinz Ulmerich, Lambsheim; Graham E. McKee, Weinheim; Horst Reimann, Worms; Richard Pflueger, Ludwigshafen; Rainer Theysohn, Frankenthal, all of Fed. Rep. of Germany

[73] Assignee: BASF Aktiengesellschaft, Ludwigshafen, Fed. Rep. of Germany

[21] Appl. No.: 140,794

[22] Filed: Jan. 5, 1988

[30] Foreign Application Priority Data

Jan. 8, 1987 [DE] Fed. Rep. of Germany ....... 3700330

[51] Int. Cl.$^4$ .............................................. C08L 77/00
[52] U.S. Cl. ................................... 524/381; 524/382; 524/394; 525/66; 525/183
[58] Field of Search ................. 525/103, 66; 524/381, 524/382, 394

[56] References Cited

U.S. PATENT DOCUMENTS

| | | | |
|---|---|---|---|
| 3,700,751 | 10/1972 | Mueller et al. | 525/183 |
| 3,705,134 | 12/1972 | James | 524/382 |
| 3,742,916 | 7/1973 | Wessberg et al. | 122/390 |
| 4,174,358 | 11/1979 | Epstein | 525/183 |
| 4,310,638 | 1/1982 | Coran et al. | 525/183 |
| 4,335,223 | 6/1982 | Flood et al. | 525/179 |
| 4,404,325 | 9/1983 | Mason et al. | 525/183 |
| 4,436,872 | 3/1984 | Flood et al. | 525/183 |
| 4,478,978 | 10/1984 | Roura | 525/66 |
| 4,495,324 | 1/1985 | Chacko et al. | 525/66 |
| 4,554,320 | 11/1985 | Reimann et al. | 525/183 |
| 4,707,513 | 11/1987 | Baer | 525/66 |

FOREIGN PATENT DOCUMENTS 1669702 5/1973 Fed. Rep. of Germany .
2622973 12/1976 Fed. Rep. of Germany .

*Primary Examiner*—Melvyn I. Marquis
*Assistant Examiner*—A. Carrillo
*Attorney, Agent, or Firm*—Oblon, Spivak, McClelland, Maier & Neustadt

[57] ABSTRACT

High-impact polyamide molding compositions contain as essential components (X) from 40 to 98% by weight, based on (X)+(Y), of a thermoplastic polyamide, (Y) from 2 to 60% by weight, based on (X)+(Y), of a rubberlike polymer which contains, as copolymerized units, an acrylic or methacrylic ester or an unsaturated carboxylic acid, (Z) from 0.001 to 2% by weight, based on (X)+(Y), of a metal compound selected from the group consisting of ($Z_1$) salts of divalent, trivalent or tetravalent metals with $C_2$–$C_4$-carboxylic acids, ($Z_2$) oxides of germanium or antimony and ($Z_3$) alkyl orthotitanates and dialkyltin dilaurates.

7 Claims, No Drawings

POLYAMIDE COMPOSITIONS CONTAINING ALKYL ORTHOTITANATE OR DIALKYLTIN DILAURATE

The present invention relates to a polyamide-based polyblend combining high impact strength with excellent homogeneity.

The mechanical properties of polymers frequently depend on their previous treatment. For instance, the impact strength of moldings from polyamide plastics depends appreciably on the water content of the moldings.

In the anhydrous state, in particular moldings produced from freeflowing, preferably highly crystalline, polyamides of average molecular weight are relatively sensitive to impact stress. There is therefore a demand for rapidly processable, freeflowign polyamide molding compositions from which it is possible to produce moldings which, in the dry state, have high impact strength and flexibility.

There are various existing methods for increasing the impact strength and flexibility of polyamides. For instance, according to U.S. Pat. No. 3,742,916 and DE-B-No. 1, 669,702, a certain improvement is obtained by adding copolymers of ethylene and tertiary (meth)acrylic esters.

According to DE-B-No. 1,241,606, copolymers of ethylene, (meth)acrylates and (meth)acrylic acid are used for increasing the impact strength of polyamides.

DE-A-No. 2,713,537 describes high-impact products where tertiary copolymers of ethylene, 4% by weight of acrylic acid and ethyl or tert-butyl acrylate (12 and 7% by weight respectively) are used.

According to EP-A-No. 96,264, a further improvement is achieved by using an ethylene copolymer which contains, as copolymerized units, from 20 to 40% by weight of a primary or secondary $C_2$–$C_8$-alkyl ester of (meth)acrylic acid and from 0.5 to 8% by weight of an acid-functional or latently acid-functional monomer.

DE-A-No. 2,622,972 discloses that a polyamide can be improved in impact strength by adding a polymer which has adhesive sites for polyamide and a tensile modulus of elasticity lower than that of polyamide by a factor of not less than 10, ie. is very flexible. The polymers are used in a partially neutralized form, preference being given to copolymers of ethylene, (meth)acrylates and (meth)acrylic acid, the last being present as alkali metal, alkaline earth metal or zinc salts.

In preparing such high-impact polyamide molding compositions by blending polyamides with a rubber component, it is frequently difficult to obtain consistent reproducibility of the properties. Even if an effort is made to use exactly identical starting materials and identical blending conditions, the polyamide molding compositions more or less vary from batch to batch in impact strength.

It is an object of the present invention to prepare polyamide molding compositions which have a consistently high impact strength.

We have found that this object is achieved by adding certain metal compounds.

The present invention accordingly provides a high-impact polyamide molding composition containing as essential components (X) from 40 to 98% by weight, based on (X)+(Y), of a thermoplastic polyamide, (Y) from 2 to 60% by weight, based on (X)+(Y), of a rubberlike polymer which contains, as copolymerized units, an acrylic or methacrylic ester or an unsaturated carboxylic acid, (Z) from 0.001 to 2% by weight, based on (X)+(Y), of a metal compound selected from the group consisting of ($Z_1$) salts of divalent, trivalent or tetravalent metals with $C_2$–$C_4$-carboxylic acids, ($Z_2$) oxides of germanium or antimony and ($Z_3$) alkyl orthotitanates and dialkyltin dilaurates.

The metal compounds (Z) usually act as transesterification catalysts. We assume that in the present case they bring about an attachment of the polymer chains of an elastomeric copolymer to those of polyamide.

The polyamides according to the invention are known per se and comprise those semicrystalline and amorphous resins not less than 5,000 in molecular weight which are customarily referred to as nylons. Polyamides of this type are preparable by condensing equimolar amounts of a saturated dicarboxylic acid of 4 to 12 carbon atoms with a diamine of 4 to 14 carbon atoms. To obtain an excess of terminal amino groups against terminal carboxyl groups in the polyamide, the diamine can be used in excess.

Examples of polyamides of this type are polyhexamethyleneadipamide (nylon 66), polyhexamethyleneazelamide (nylon 69), polyhexamethylenesebacamide (nylon 610) and polyhexamethylene dodecanediamide (nylon 612). Another group of polyamides is obtained by a ring opening of lactones, eg. poly-$\epsilon$-caprolactam (nylon 6), polylaurolactam, poly-11-aminoundecanoic acid and bis(p-aminocyclohexyl)methanedodecanediamide. It is also possible to use in the invention polyamides prepared by copolymerizing two of the abovementioned polymers or by terpolymerizing the abovementioned polymers or components thereof, for example copolymers of adipic acid, isophthalic acid and hexamethylenediamine or copolymers of $\epsilon$-caprolactam, terephthalic acid and hexamethylenediamine. Preferably, the polyamides are linear and have melting point of more than 200° C.

The proportion of polyamide ranges from 40 to 98, preferably from 70 to 95, in particular from 75 to 92, % by weight based on the total weight of (X)+(Y).

Preferred polyamides are polyhexamethyleneadipamide and polycaprolactam. The polyamides have in general a relative viscosity from 2.5 to 5, determined from a 1% strength solution in $H_2SO_4$ at 25° C. Polyamides having a relative viscosity from 2.6 to 4.0, in particular from 2.7 to 3.5, are used in preference.

The impact-modifying component Y is a rubberlike polymer which contains, as copolymerized units, an acrylic or methacrylic ester or an unsaturated carboxylic acid.

Examples of acrylic and methacrylic esters are methyl acrylate, ethyl acrylate, n- or i-propyl acrylate, n-, i- or t-butyl acrylate, 2-ethylhexyl acrylate and the corresponding esters of methacrylic acid.

Examples of unsaturated carboxylic acids are acrylic acid, methacrylic acid or maleic acid and fumaric acid. Maleic anhydride also behaves like an unsaturated carboxylic acid, and therefore is likewise included in this group.

The proportion of the abovementioned units in the impact-modified component can vary over wide ranges, but in general is not more than 60% by weight, preferably from 0.2 to 50% by weight, based on the total weight of component Y). However, this upper limit does not apply to graft rubbers based on (meth)acrylic esters; in such graft rubbers, the proportion of acrylic or methacrylic ester can be far higher than 60% by weight. At the limit, component Y) can consist in its entirety of a graft base of elastomeric polyacrylate and a graft envelope of various (meth)acrylic esters or unsaturated carboxylic acids.

In what follows, some preferred components Y are representatively described in more detail:
1. Ethylene copolymers of composition ABCD, where A, B, C and D are units of the following monomers:
   A = ethylene,
   B = ester of acrylic or methacrylic acid, in amounts from 0 to 50% by weight,
   C = acrylic or methacrylic acid, in amounts from 0.2 to 10% by weight, and
   D = maleic anhydride, in amounts from 0 to 2% by weight;
2. graft rubbers produced in emulsion of composition EF, where the graft base E is a polybutadiene or polyacrylate rubber present in amounts from 60 to 90% by weight, and the graft envelope F (in amounts from 40 to 10% by weight) was formed from the following monomers:
   0–98% by weight of esters of acrylic or methacrylic acid,
   0–80% by weight of styrene, acrylonitrile and/or vinyl methyl ether,
   2–20% by weight of acrylic or methacrylic acid, or of a longer-chain carboxylic acid;
3. graft rubbers of composition GH, where the graft base G is a thermoplastic copolymer of ethylene and propylene, with or without a diene, present in amounts from 90 to 99.5% by weight, and the graft envelope H was formed from the following monomers:
   0.5–5% by weight of esters of acrylic or methacrylic acid,
   0–5% by weight of acrylic or methacrylic acid,
   0–2% by weight of maleic anhydride.

The above-described olefin polyesters ABCD and GH are generally of high molecular weight and have an MFI 190/2.16 melt index (German Standard Specification DIN 53,735) from 4 to 20 g/min. The copolymers can be prepared in a conventional manner by polymerizing the components at elevated temperature under high ethylene pressure.

The proportion of component (Y) ranges from 2 to 60, preferably from 5 to 30, in particular from 8 to 25, % by weight, based on the total weight of (X)+(Y).

The composition according to the invention contains as component Z) from 0.001 to 2, preferably from 0.01 to 0.2, in particular from 0.05 to 0.5, % by weight, based on (X) +(Y), of a metal compound selected from the group consisting of
($Z_1$) salts of divalent, trivalent or tetravalent metals with $C_2$–$C_4$ carboxylic acids,
($Z_2$) oxides of germanium or antimony, and
($Z_3$) alkyl orthotitanates and dialkyltin dilaurates.

Preference as components ($Z_1$) is given to calcium acetate and magnesium acetate, cadmium acetate, lead acetate and cobalt acetate, as components ($Z_2$) to antimony pentoxide, and as components $Z_3$) to $C_1$–$C_8$-alkyl orthotitanates and di($C_1$–$C_8$-alkyl)tin dilaurates.

Examples of $C_1$–$C_8$-alkyl are methyl, ethyl, n-propyl, n-butyl, n-hexyl and octyl, preference being given to n-butyl. Accordingly, tetra(n-butyl) orthotitanate and di(n-butyl)tin dilaurate are very particularly preferred for use as component $Z_3$).

Particular preference is given to tetrabutyl orthotitanate and dibutyltin dilaurate.

In addition to the essential components (X), (Y) and (Z), the compositions according to the invention may contain customary additives, such as stabilizers and oxidation retardants, agents against thermal decomposition and decomposition by ultraviolet light, lubricants, mold release agents, colorants, such as dyes and pigments, fibrous and pulverulent fillers and reinforcing agents, nucleating agents, plasticizers and polymeric additives.

The stabilizers, the proportion of which generally does not amount to more than 10% by weight of a composition, can be added at any stage of production. Preferably, the stabilizers are added early on, so as to prevent the onset of decomposition even before the composition can be stabilized. Stabilizers of this type should preferably be compatible with the composition.

Oxidation retardants and heat stabilizers, which in general may be added to the thermoplastic compositions in an amount of up to 5% by weight, based on the total weight thereof, are for example halides of metal of group I of the periodic table, eg. sodium, potassium or lithium, together with a copper(I) halide, for example a chloride, bromide or iodide thereof, sterically hindered phenols, hydroquinones, variously substituted representatives thereof and combinations thereof.

The UV stabilizers used can likewise be those which are generally added to polymers, in amounts of up to 2.0% by weight, based on the mixture (X)+(Y). Examples of UV stabilizers are variously substituted resorcinols, salicylates, benzotriazols, benzophenones and the like.

Suitable lubricants and mold release agents are stearic acid, stearyl alcohol and stearamides; it is also possible to use: organic dyes, such as nigrosine and the like, pigments, eg. titanium dioxide, cadmium sulfide, cadmium sulfide selenide, phthalocyanines, ultramarine blue, carbon black and the like; fibrous and pulverulent fillers and reinforcing agents, such as carbon fibers, glass fibers, amorphous silica, asbestos, calcium silicate, aluminum silicate, magnesium carbonate, kaolin, chalk, quartz powder, mica, feldspar and the like, in amounts of up to 50% by weight of the composition; nucleating agents, such as talc, calcium fluoride, sodium phenylphosphinate, alumina and finely divided polytetrafluoroethylene and the like, plasticizers in amounts of up to about 20% by weight, based on the mixture (X)+(Y), eg. dioctyl phthalate, dibenzyl phthalate, butyl benzyl phthalate, hydrocarbon oils, N-n-butylbenzenesulfonamide and o- or p-tolueneethylsulfonamide. The colorants (dyes and pigments) are generally added in amounts of up to about 5.0% by weight, based on the mixture (X)+(Y).

Suitable polymeric additives are for example polyphenylene oxide, polycarbonate, polyethylene terephthalate, polybutylene terephthalate, and ABS or ASA graft copolymers, which can be added to the mixture (X)+(Y) in amount from 10 to 100% by weight.

The molded compositions according to the invention are customarily produced in a sealed system by melt-mixing the polyamide with the other components to give a homogeneous mixture, in a multiple screw extruder, such as a Werner & Pfleiderer twin-screw extruder, or other traditional plasticizing apparatus, such as a Brabender mill, a Banbury mill or the like. The blends, however, can also be produced by coprecipitation from solutions or mixing or dry blending the components and subsequently melt-extruding the dry mixture.

In a special embodiment, component (Z) is premixed with component (Y) or a portion thereof and then admixed as a batch to component (X) and, as the case may be, the remainder of Y).

Owing to the intensive mixing process, the olefin polymer in the polyamide is in general present in the form of individual particles less than 3 μm, preferably less than 1 μm, in size.

The molded compositions according to the invention are suitable for injection molding and extrusion, for producing highly stressable, thermostable, high-impact moldings for industrial purposes of any kind.

In the example, the parts and percentages are by weight.

EXAMPLE

An emulsion copolymer was prepared by polymerizing 67.2 parts of a mixture of 99 parts butadiene and 1 part of t-dodecylmercaptan in an aqueous emulsion. This was followed by a specifically controlled agglomeration of polybutadiene particles by addition of an emulsion of a copolymer of ethyl acrylate and methacrylamide (96:4) in water. The ratio ethyl acrylate copolymer:polybutadiene-t-dodecylmercaptan polymer was 4:96. The agglomerated polybutadiene emulsion was grafted (outer envelope) with a monomer mixture of n-butyl acrylate, t-butyl acrylate and methacrylic acid (93.4:6:0.6). The ratio core (polybutadiene-t-dodecylmercaptan):outer envelope was 7:3.

The thermoplastic molded composition was prepared in an extruder (type ZSK 53 from Werner und Pfleiderer). 50 parts of nylon 6 (relative viscosity 3.3, measured in 1% strength solution in concentrated sulfuric acid) were introduced at the intake of the extruder, plasticized in a first screw zone having deeply cut thread profiles, and conveyed via a kneading zone into a second screw zone where the aqueous suspension of the elastomeric polymer (50 parts of polymer + 50 parts of water) was metered in, the emulsion being conveyed by the liquid prepressure of a meterpump.

The thermoplastic and the rubber were intimately mixed with each other in subsequent sections differing in the number of flights and the pitch. After the kneading zone the spontaneously evaporated water was removed in vapor form through venting ports, and subsequently the molded composition was extruded, and the extrudate was cooled down and comminuted.

In a ZSK 30 extruder from Werner und Pfleiderer, this preliminary product was diluted with nylon 6 (relative viscosity 2.69) to a rubber content of 24% by weight. This batch was repeated twice, except that before each extrusion 0.1% by weight of tetrabutyl orthotitanate (TBOT) and 0.1% by weight of dibutyltin dilaurate (DBTDL) respectively were compounded into the polymer granules in a tumbler mill.

2 mm roundels (composition temperature 280° C.) were subjected to a penetration test in accordance with German Standard Specification DIN 53,443 sheet 2. The damaging energy and the total energy were determined together with the coefficient of variation. The results are as follows:

|  | Damaging energy at −40° C. [Nm] (coefficient of variation, %) | Total energy −40° C. [Nm] (coefficient of variation, %) |
| --- | --- | --- |
| Batch 1 (comparison) | 21 (93) | 27 (105) |
| Batch 2 (with TBOT) | 42 (3) | 63 (15) |
| Batch 3 (with DBTDL) | 40 (3) | 75 (7) |

We claim:
1. A high-impact polyamide molding composition containing as essential components:
(X) from 40 to 98% by weight based on (X)+(Y), of a thermoplastic polyamide,
(Y) from 2 to 60% by weight, based on (X)+(Y), of a polymer selected from the group consisting of:
  1. ethylene copolymers of composition ABCD, where A, B, C and D are units of the following monomers:
     A=ethylene,
     B=ester of acrylic or methacrylic acid, in amounts from 0 to 50% by weight,
     C=acrylic or methacrylic acid, in amounts from 0.2 to 10% by weight, and
     D=maleic anhydride, in amounts from 0 to 2% by weight;
  2. graft rubbers produced in emulsion of composition EF, where the graft base E is a polybutadiene or polyacrylate rubber present in amounts from 60 to 90% by weight, and the graft envelope F, in amounts from 40 to 10% by weight, is formed from the following monomers: 0–98% by weight of esters of acrylic or methacrylic acid, 0–80% by weight of styrene, acrylonitrile or vinyl methyl ether, 2–20% by weight of acrylic or methacrylic acid, or of a longer-chain carboxylic acid; and
  3. graft rubbers of composition GH, where the graft base G is a thermoplastic copolymer selected from the group consisting of an ethylene-propylene copolymer and an ethylene-propylenediene copolymer present in amounts from 90 to 99.5% by weight, and the graft envelope H is formed from the following monomers:
     0.5–5% by weight of esters of acrylic or methacrylic acid,
     0–5% by weight of acrylic or methacrylic acid, and
     0–2% by weight of maleic anhydride, based on total graft rubber composition and
(Z) from 0.001 to 2% by weight, based on (X)+(Y), of a metal compound selected from the group consisting of alkyl orthotitanates and dialkyltin dilaurates.

2. A high-impact polyamide molding composition as claimed in claim 1, wherein component Z is an alkyl orthotitanate of 1–8 carbon atoms or a di($C_1$-$C_8$-alkyl)-tin dilaurate.

3. A high-impact polyamide molding composition as claimed in claim 2, wherein component Z is tetrabutyl orthotitanate.

4. A high-impact polyamide molding composition as claimed in claim 2, wherein component Z is dibutyltin dilaurate.

5. A high-impact polyamide molding composition as claimed in claim 1, wherein component 3 comprises a graft base G wherein the copolymer consists of ethylene and propylene.

6. A high-impact polyamide molding composition as claimed in claim 1, wherein component 3 comprises a graft base G wherein the copolymer consists of ethylene, propylene and a diene.

7. A molding obtainable from a high-impact polyamide molding composition as claimed in claim 1.

* * * * *